June 23, 1970     T. J. MANNING, JR., ET AL     3,516,453
EXPANDING APPARATUS FOR ASSEMBLING AND INSERTING INSULATION
INTO A ROCKET MOTOR CASE Filed Jan. 15, 1968     2 Sheets-Sheet 1

Thomas J. Manning Jr. INVENTOR.
Alfred H. Glover

BY

ATTORNEY

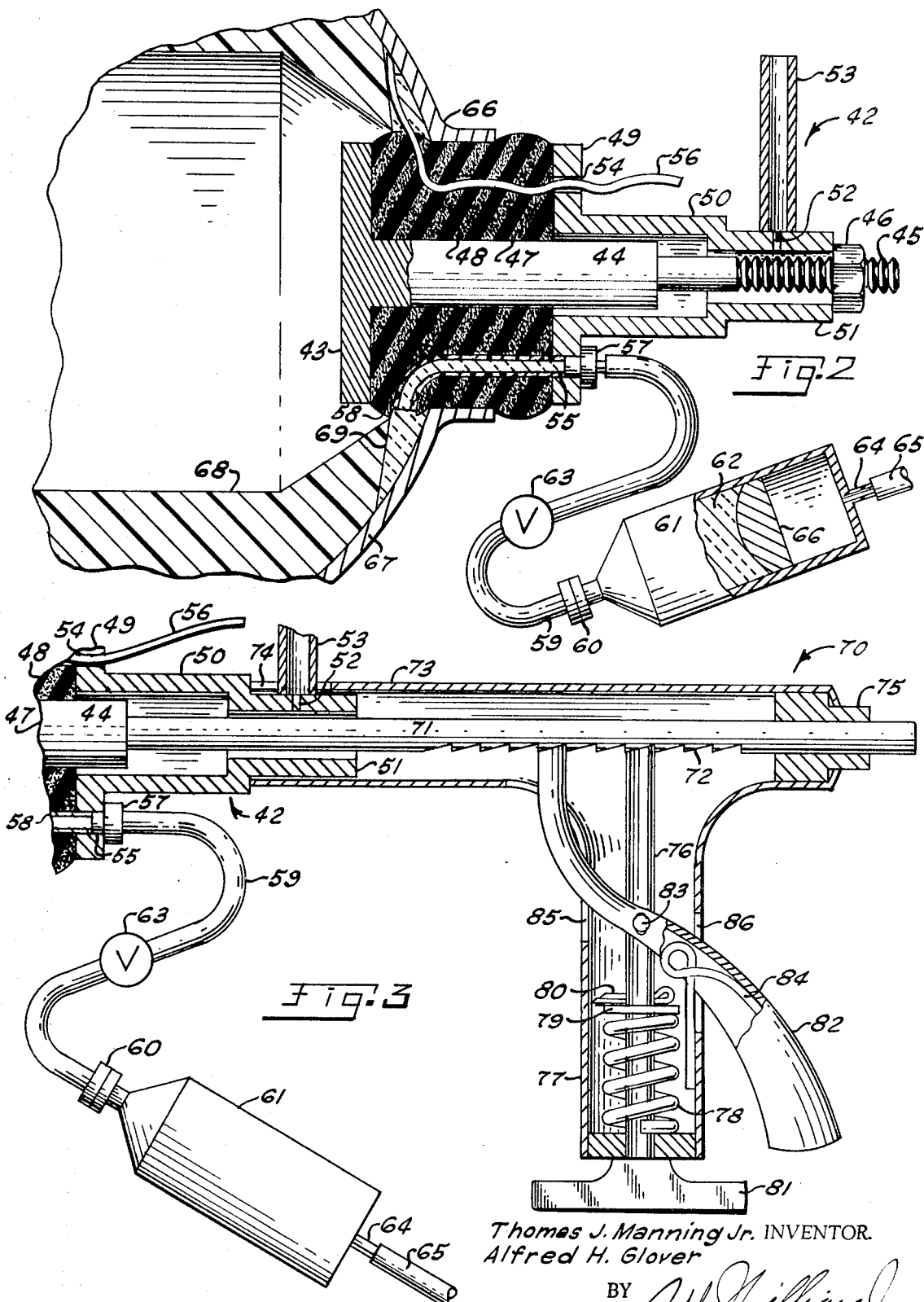

United States Patent Office 3,516,453
Patented June 23, 1970

3,516,453
EXPANDING APPARATUS FOR ASSEMBLING
AND INSERTING INSULATION INTO A
ROCKET MOTOR CASE
Thomas J. Manning, Jr., Huntsville, and Alfred H.
Glover, Somerville, Ala., assignors to Thiokol
Chemical Corporation, Bristol, Pa., a corporation
of Delaware
Filed Jan. 15, 1968, Ser. No. 697,675
Int. Cl. B65b 31/00
U.S. Cl. 141—59                                    2 Claims

ABSTRACT OF THE DISCLOSURE

An expanding apparatus including, an expanding medium sandwiched between a pair of compression members, a mechanical arrangement associated with the compression members, to actuate the compression members, to dilate the expanding medium, and injection and evacuation systems, cooperating with the expanding medium and the compression members, to insert insulation into a rocket motor case.

BACKGROUND OF THE INVENTION

Field of the invention

Because of the various types of insulation that are used in rocket motor cases, to prevent damage to the rocket motor cases, during burnout of the solid propellant, in the rocket motor cases, many problems have been encountered in providing equipment, that could be designed, to function with more than one type of insulation.

The present invention, embodies an apparatus that with slight modifications, can be utilized to assemble premolded insulation, as well as insert a flowable insulation, into a rocket motor case.

Description of the prior art

Various types of equipment have been employed, to assemble and install insulation in a rocket motor case, but in most instances the equipment was not susceptible to modifications, to permit assembly of a premolded insulation, and the insertion of a flowable insulation, into a rocket motor case.

Therefore the apparatus, that will accomplish both operations, with slight modifications, is an advance over the prior art in solving the problems, that arise with the particular type of insulation that is involved.

SUMMARY OF THE INVENTION

This invention relates to apparatus, that is especially adopted, to assemble premolded insulation, for rocket motor cases, and with a few modifications, insert flowable insulation, into a rocket motor case.

Molded vulcanized rubber insulation is difficult to revulcanize, and since the dome insulation is premolded for sake of simplicity, some means had to be devised whereby the dome insulation could be rigidly secured, to the premolded cylindrical motor case insulation. It was determined that if sufficient contact pressure could be maintained, that certain adhesives, now available, could be utilized to bond the dome insulation to the motor case insulation.

Under ordinary conditions and requirements the dome insulation, must not, adhere to the motor case dome, and since it would require a very complicated process, and tooling to vulcanize the dome insulation in place, the premolded insulation, must be assembled and cured, before it is positioned in the rocket motor case.

The instant invention, provides a correct dimensional orientation, of the dome insulation, and also provides the desired contact pressure, to accomplish good bonding during the assembly, of the premolded insulation. It is also necessary, to restrict the use of the adhesive to the bonded area, and the apparatus embodying the invention, will accomplish this requirement.

In some installations of insulation, voids appear in the head end of the rocket motor case, that must be filled with a flowable insulation, and the instant apparatus may with a few modifications be adapted, for use in inserting, this type of insulation, into a rocket motor case.

It is an object of the invention therefore, to provide an apparatus that will assemble premolded insulation, and with a few modifications be usable, to insert flowable insulation, into a rocket motor case.

The present invention, therefore, basically includes an expanding member, that is utilized to assemble, or adopt the apparatus to perform the necessary action, for two different types of insulation, and it is believed, that from the accompanying description, other objects and advantages than those specified, will be apparent to one skilled in the art, when such description is read in conjunction with, the accompanying drawings in which:

BRIEF DESCRIPTION OF THE DRAWINGS

FIG. 2 is a detailed fragmentary sectional view, partly in elevation, illustrating the use of the apparatus embodying the present invention, in inserting a flowable insulation, into a rocket motor case; and FIG. 3 is a detailed fragmentary sectional view, partly in elevation, illustrating another arrangement, for applying pressure, to the compression members of the apparatus.

DESCRIPTION OF THE PREFERRED EMBODIMENTS

Figure 1:
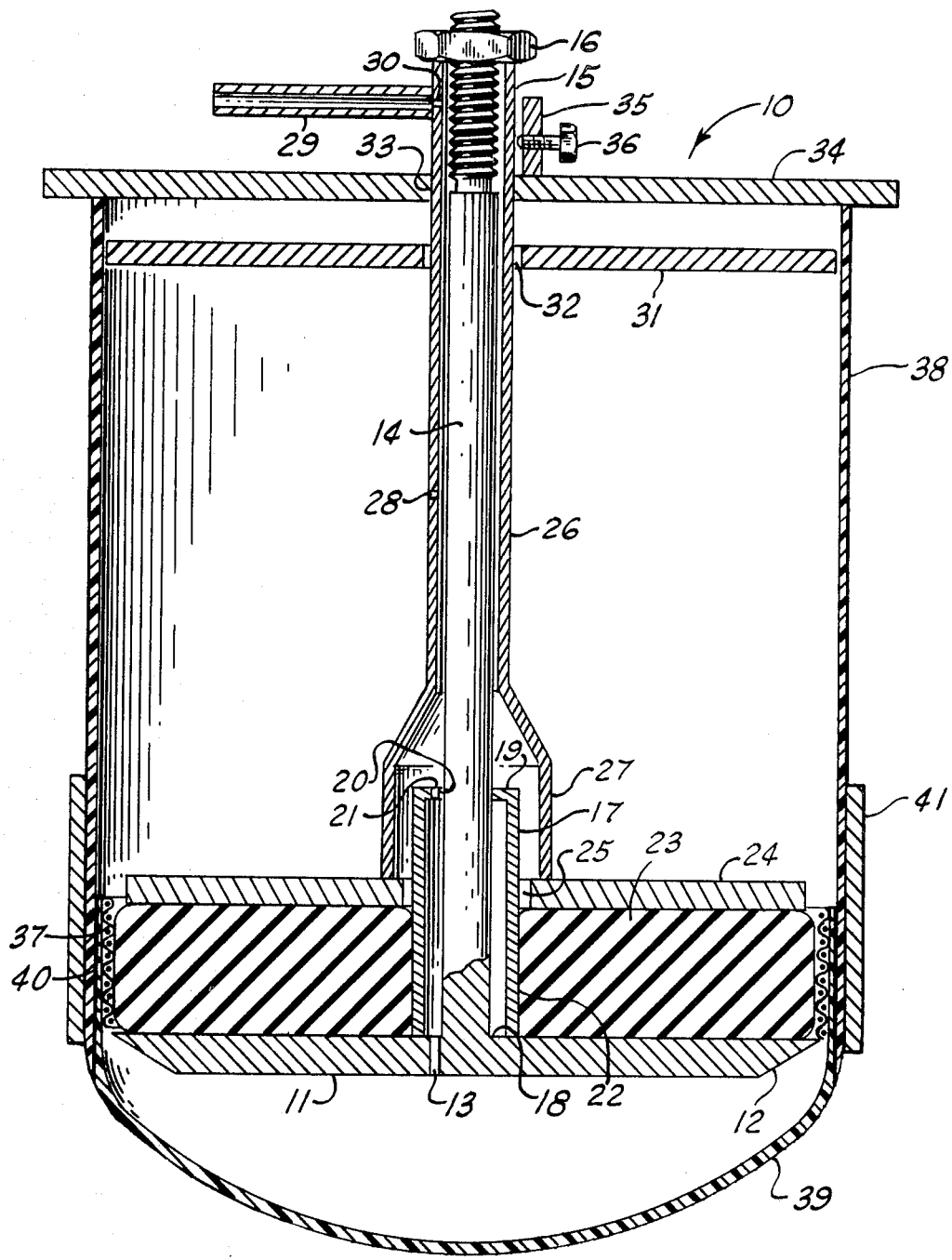
FIG. 1 is a vertical sectional view, of an apparatus embodying the invention, illustrating the manner of use, when assembling premolded insulation.

Referring more in detail to the drawings and especially to FIG. 1, wherein like parts are designated by like reference numerals, the reference numeral 10, is used to generally designate, one form of the apparatus, embodying the invention.

The apparatus 10, includes a lower disc shaped compression member 11, having a beveled peripheral edge 12, and a vent port 13 centrally thereof. Extending at right angles, from the center of the compression member 11, in perpendicular relation thereto, and unitary therewith, is a rod 14, having a reduced threaded outer or free end 15, on which is adapted to be threaded, a nut 16, for a purpose to be later described.

Positioned on the upper surface of the compression member 11, in vertical spaced relation thereto, and in spaced circumjacent relation to the rod 14, is a tubular centering member 17, having an open end 18, and a closed end 19, having a central opening 20, therein, to receive the rod 14, and a vent port 21, is positioned adjacent to the opening 20, and rod 14.

Also arranged, on the upper surface of the compression member 11, and which by reason, of a central opening 22 therein, is in circumjacent relation to the centering member 17, is an expanding member 23, which is of circular shape, and premolded from silicone rubber. Likewise, located on the upper surface of the expanding member 23, is an upper disc shaped compression member 24, that by reason, of a central opening 25 therein, is also in circumjacent relation to the centering member 17.

There is also disposed on the rod 14, in circumjacent relation thereto, a tubular member 26, that has a lower conical shaped portion 27, that engages the upper surface of the compression member 24, and is also in circumjacent relation, to the centering member 17. The tubular member 26 also has a vent port 28 therein, and a hollow tubular handle 29, is rigidly secured to the outer surface of the tubular member 26, adjacent to the upper free end thereof, and extends laterally therefrom, at right angles thereto. A vent port 30, in the tubular member 26, has communication with the tubular handle 29.

An alignment or centering disc 31, is slidably mounted on the tubular member 26, by reason of a central opening 32 therein, and the disc 31, is also in circumjacent relation to the tubular member 26.

Also slidably mounted on the tubular member 26, by reason of a central opening 33 therein, is a positioning disc 34, which is also in circumjacent relation to the tubular member 26.

Extending upwardly from the disc 34, in vertical perpendicular relation thereto, and adjacent to the tubular member 26, is a stud 35, in which is threadably mounted a bolt 36.

The members 31 and 34 are mounted and positioned on the tubular member 26, before the handle 29, is secured to the tubular member 26, the member 23 is then located on the member 11, after the member 17, has been positioned on the rod 14, and the rod 14 is then inserted into the lower end of the tubular member 26, until the free end 15 thereof, can be slightly engaged, with the nut 16.

In the operation, of the form of the invention, shown in FIG. 1, a circular band of screen glass 37, is placed on the periphery of the expanding member 23, and the apparatus 10, is then lowered into, a premolded cylindrical motor case insulation 38. A premolded dome insulation 39, has a suitable adhesive 40, applied to the outer surface thereof, adjacent the peripheral edge thereof, and this edge, is then inserted between the screen glass 37, on the expanding member 23, and the inner surface of the insulation 38, adjacent the peripheral edge thereof. Then a circular reinforcing band 41 is placed around the outer surface of the insulation 38, in aligned circumjacent relation with the expanding member 23, and the peripheral edges of the insulation 38, and the dome insulation 39.

The alignment or centering disc 31 has a tight frictional fit with the tubular member 26, and after it is moved, into the insulation 38, it will remain in fixed relation to the tubular member 26 to properly align the apparatus 10. The positioning disc 34 is then moved into engagement with the upper peripheral edge of the insulation 38, all as shown in FIG. 1.

When the apparatus 10 has been properly oriented for operation, the bolt 36 is tightened until it engages the tubular member 26 to retain the compression member 24 in fixed relation to the insulation 38 by reason of the engagement of the tubular member 26 with the upper surface of the compression member 24.

The nut 16 is then rotated on the free end 15 of the rod 14 by suitable mechanical means, and such action will draw the rod 14 upwardly within the tubular member 26. Since the rod 14 is unitary with the compression member 11, it will also move upwardly against the expanding member 23 to dilate this member to cause it to exert pressure on the peripheral edge of the dome insulation 39 to bond it, by reason of the adhesive 40, to the insulation 38. It will be noted that the peripheral edges of the insulation 38 and dome insulation 39 are chamfered to provide a more perfect bond, between the peripheral edges, of these two insulations. The reinforcing ring 41 applying pressure to the outer surface of the insulation 38 will prevent deformation of the insulation 38, during the expanding, of the expanding medium 23, and will remain in position until the adhesive 40 has cured, and the bond between the two insulations has been achieved. The vents, provided in the apparatus, prevent any entrapment of air, in the apparatus 10, during the operation thereof, and the handle 29 permits handling of the apparatus 10 as required. Reversal of these steps, after the bonding of the two insulations has been achieved, will permit removal of the apparatus 10, outwardly of the insulation 38, and the subsequent removal of the reinforcing ring 41.

The insulation assembly, as previously described, is now ready to be inserted into position in a rocket motor case, not shown, at which time the outer surface of the insulation 38 will be bonded to the inner surface of the rocket motor case, but as previously stated, the dome insulation 39 is not bonded to the inner surface of the dome of the rocket motor case.

In the form of the invention shown in FIG. 2, slight modifications have been made to permit the apparatus 42 to be utilized in inserting flowable insulation into a rocket motor case.

The apparatus 42 includes a lower disc shaped compression member 43, and extending at right angles from the center of the compression member 43, in perpendicular relation thereto, and unitary therewith, is a rod 44 having a reduced threaded outer or free end 45, on which is adapted to be threaded a nut 46 for a purpose to be later described.

Arranged on the upper surface of the compression member 43, and which by reason of a central opening 47 therein, is in circumjacent relation to the rod 44, is an expanding member 48, which is of circular shape, and premolded from silicone rubber. Located on the upper surface of the expanding member 48 is an upper disc shaped compression member 49, that by reason of a centrally located tubular portion 50, unitary therewith, is also in circumjacent relation to the rod 44, as in the tubular portion 50, unitary with the upper end of the tubular portion 50, and in communication therewith, is a reduced tubular end portion 51, which is also in circumjacent relation to the reduced end 45 of the rod 44. The end portion 51 has a vent port 52 therein, and a hollow tubular handle 53, is rigidly secured to the outer surface of the end portion 51, adjacent to the upper free end thereof, and extends laterally therefrom, at right angles thereto, and the vent port 52 has communication with the tubular handle 53.

The compression member 49, is provided with a pair of diametrically opposed openings, 54 and 55, and a bleed needle 56, extends into the opening 54 and is forced through the expanding member 48, until it extends outwardly of the circumferential surface thereof, as shown in FIG. 2, for a purpose to be later described.

A two way coupling 57, is positioned in the opening 55, and is attached at one end, to a metal tube 58, that extends from the coupling 57, through the expanding member 48, till the outer end thereof terminates, in the same plane as the outer circumferential surface, of the expanding member 48. The opposite end of the coupling 57 is connected, to a flexible conduit 59, which is connected by a coupling 60, to a tubular container 61, for a flowable insulating material 62. The conduit 59, has a flow control valve 63, therein, and the container 61, has an inlet, outlet, tubular connection 64, to which is connected a compressed air line 65. A sliding piston member 66, is positioned in the container 61, so that air flow introduced into the container 61, will force the piston member 66, against the insulating material 62, to force it outwardly of the container 61.

In the operation, of this form of the invention, the apparatus 42, with the metal tube 58, installed in the expanding member 48, is inserted into the igniter opening 66, in a conventional rocket motor case 67, in which has been previously cast, a solid propellant 68. When the solid propellant 68, is cast into the rocket motor case 67, there remains a void area 69, adjacent the opening 66, in circumjacent relation thereto. Since the void area 69, must be filled with the insulation material 62, to prevent burnout of the rocket motor case 67, in the void area 69, the apparatus 42, is utilized to fill the void area 69, with the material 62. The nut 46, is tightened on the threaded portion 45, of the rod 44, until the expanding member 48 by reason of its compression, by the compression members 43 and 49, provides an air tight seal between the opening 66, and the expanding member 48, the needle 56 is then forced through the expanding member 48, by reason of the opening 54, and an air evacuator, not shown, is connected to the needle 56, and will evacuate any air trapped, in the void area 69. The conduit 59, has been connected to the coupling 57, and as the air is evacuated from the void area 69, pressure exerted on the piston 66, from the air line 65, will force the insulation material 62, into the void area 69, as the air is evacuated therefrom. The valve 63, will control the flow of the insulating material 62, and will be closed when the void area 69, has been completely filled, with the insulating material 62. After this has been accomplished, the nut 46 will be loosened to reduce the expansion of the expanding member 48, and the apparatus 42, can then be withdrawn from the opening 66, in the motor case 67.

In FIG. 3 wherein a portion of the apparatus 42, of FIG. 2, is shown, a pistol grip assembly 70, is used to replace the nut 46, as shown in FIG. 2, the same may also apply to FIG. 1, in replacing the nut 16.

In FIG. 3 the portion 45, of the rod 44, has been replaced by an elongated rack bar 71, having teeth 72 thereon. The pistol grip assembly housing 73, is positioned over the end portion 50, and by reason of an elongated slot 74, in the housing 73, is moved forward on the portion 51, until the end of the housing 73, engages the tubular portion 50. A bearing bushing 75, slidably receives the outer end of the rack bar 71, so it can move freely in proper alignment within the housing 73.

A spring biased, retention bar 76, extends into the grip piston 77, of the housing 73, and by reason of the tension spring 78, mounted thereon, and retained in place, by means of a washer 79, and cotter key 80, engages the teeth 72, on the rack bar 71, a handle 81, on the outer end of bar 76, permits removal of the end of the bar 76, from engagement with the teeth 72, on the rack bar 71. A fulcrum member 82, is pivoted at 83, on the bar 76, and is biased by a spring 84, so that the end of the member 82, is free to also engage the teeth 72, on the rack bar 71, free movement of the fulcrum member 82, is provided by opposed slots 85, and 86, in the housing 73.

It is believed that the operation of the pistol grip assembly 70, will be apparent to one skilled in the art, however as the fulcrum member 82, is manipulated, the rack bar 71, will be moved through the housing 73, by reason of the engagement of the end of the fulcrum member 82, with the teeth 72, on the rack bar 71, and the compression members 43, and 49, will expand the expanding member 48, as previously described. The bar 76, will retain the rack bar 71, under compression, by the engagement of the end thereof, with the teeth 72, on the rack bar 71. When it is desired to remove the apparatus 42, from the opening 66, in the motor case 67, the handle 81, is gripped to disengage the bar 76, and fulcrum member 82, from engagement with the teeth 72, on the rack bar 71, the pistol grip assembly 70, can then be recovered from the opening 66, in the motor case 67. As previously stated, the pistol grip assembly 70, may also be used in the operation, of the form of the invention, as shown in FIG. 1, by substituting a rack bar, for the portion 15, on the rod 14.

It is believed that from the foregoing description, the assembly, as well as the mode of operation, of the invention, will be apparent to one skilled in the art, and it is to be understood, that variations in such assembly, and the mode of operation thereof, may be adhered to, providing such variations, fall within the spirit of the invention, and the scope of the appended claims.

Having thus described the invention what is claimed as new and desired to be secured by Letters Patent, is:

1. An expanding apparatus, for assembling and inserting insulation, into a rocket motor case, comprising a first compression member having a rod extending upwardly therefrom at right angles thereto, an expanding member formed of silicone rubber positioned on said first compression member, a second compression member, positioned on said expanding member, means mounted on said rod for moving said first compression member toward said second compression member, and means cooperating with said second compression member, to retain it stationary, while said first compression member is being moved toward said second compression member, to expand said expanding member, diametrically opposed openings are provided in said second compression member, and an evacuating means is inserted into one of said openings, to extend through said expanding member, outwardly thereof, and a metallic tube mounted in said expanding member, has means connected thereto, for inserting insulation into said rocket motor case.

2. An expanding apparatus as in claim 1, wherein the means for retaining said second compression member stationary, comprises a tubular member encompassing said rod in circumjacent relation thereto, and the means for moving said first compression member, engages the outer end of said tubular member.

References Cited
UNITED STATES PATENTS 3,398,964   8/1968   Trefiu _____ 277—72

HOUSTON S. BELL, JR., Primary Examiner

U.S. Cl. X.R.

141—312; 269—49; 277—72